(12) United States Patent
Etcheverry

(10) Patent No.: US 7,669,399 B2
(45) Date of Patent: Mar. 2, 2010

(54) GRAPE HARVESTING SYSTEM

(75) Inventor: John F. Etcheverry, Bakersfield, CA (US)

(73) Assignee: Sunview Marketing International, Delano, CA (US)

( * ) Notice: Subject to any disclaimer, the term of this patent is extended or adjusted under 35 U.S.C. 154(b) by 0 days.

(21) Appl. No.: 12/318,228

(22) Filed: Dec. 23, 2008

(65) Prior Publication Data

US 2009/0107101 A1    Apr. 30, 2009

Related U.S. Application Data

(62) Division of application No. 11/437,679, filed on May 22, 2006, now abandoned, which is a division of application No. 11/001,013, filed on Dec. 2, 2004, now Pat. No. 7,080,498.

(51) Int. Cl.
    *A01D 46/00* (2006.01)
(52) U.S. Cl. .................................................. 56/328.1
(58) Field of Classification Search ................ 56/328.1, 56/334, 331, 340.1, 327.1; 99/638, 478, 99/518; 414/799, 927, 928, 929, 286
See application file for complete search history.

(56) References Cited

U.S. PATENT DOCUMENTS

| | | | |
|---|---|---|---|
| 42,634 | A | 5/1864 | Babcock |
| 108,739 | A | 10/1870 | Taylor |
| 131,224 | A | 9/1872 | Paul |
| 280,639 | A | 7/1883 | Lipe |
| 311,246 | A | 1/1885 | Herrick et al. |
| 745,066 | A | 11/1903 | Koch |
| 1,172,937 | A | 2/1916 | Butcher |
| 1,298,051 | A | 3/1919 | Keator |
| 1,363,401 | A | 12/1920 | Flynn, Jr. |
| 1,712,875 | A | 5/1929 | De Stoop |
| 1,747,893 | A | 2/1930 | Fisher |
| 2,245,126 | A | 6/1941 | Day |
| 2,362,137 | A | 11/1944 | Kagan |
| 2,929,184 | A | 3/1960 | Lamouria |
| 3,045,414 | A | 7/1962 | Scheidenhelm |
| 3,360,913 | A | 1/1968 | Burton |
| 3,490,217 | A | 1/1970 | Olmo et al. |
| 3,492,801 | A | 2/1970 | Olmo et al. |
| 3,546,856 | A | 12/1970 | Hiyama |
| 3,601,964 | A | 8/1971 | Fisher |

(Continued)

FOREIGN PATENT DOCUMENTS

WO    WO 2009019620 A1 *    2/2009

*Primary Examiner*—Árpád Fábián Kovács
(74) *Attorney, Agent, or Firm*—Finnegan, Henderson, Farabow, Garrett & Dunner LLP

(57) ABSTRACT

Apparatus for harvesting grapes without damaging the grapes. A cluster hanger clip is provided to securely hold a cluster of grapes by the stem, in order to cut, carry, and transport the cluster with minimal or no touching of the grape berries. A grape harvesting vehicle which moves between the rows of grapevines in the vineyard, includes grape conveyors, on which the hanger clips are suspended, either temporarily or permanently. The conveyors convey the grape clusters to packers at packing stations on the platform. The packers segregate the grape clusters and pack the clusters into boxes. A palletizer stacks the boxes on pallets in a bin. The platform can change configuration for use in the vineyard, and for travel on the highway.

15 Claims, 9 Drawing Sheets

U.S. PATENT DOCUMENTS

| | | |
|---|---|---|
| 3,606,741 A | 9/1971 | Olmo |
| 3,715,876 A | 2/1973 | McCord |
| 3,766,724 A | 10/1973 | Paillou |
| 3,783,595 A | 1/1974 | Tolochko et al. |
| 3,830,048 A | 8/1974 | Ervin |
| 3,834,137 A | 9/1974 | Long |
| 4,172,352 A | 10/1979 | McCarthy et al. |
| 4,241,569 A | 12/1980 | Bobard et al. |
| 4,255,922 A | 3/1981 | Hiyama et al. |
| 4,291,526 A | 9/1981 | Hiyama et al. |
| 4,445,316 A | 5/1984 | Browning et al. |
| 4,736,574 A | 4/1988 | Walker |
| 4,959,950 A | 10/1990 | Burke |
| 5,067,314 A | 11/1991 | Burke |
| 5,074,108 A | 12/1991 | Claxton et al. |
| 5,339,612 A | 8/1994 | Scott |
| 5,355,667 A | 10/1994 | Scott |
| 5,423,166 A | 6/1995 | Scott |
| 5,579,600 A | 12/1996 | Burns |
| 6,003,294 A | 12/1999 | Fitzgerald et al. |
| 6,076,343 A | 6/2000 | Burke |
| 6,145,291 A | 11/2000 | Jarmain |
| 6,257,421 B1 | 7/2001 | Outten |
| 6,447,236 B1 * | 9/2002 | Grams et al. ............... 414/401 |
| 6,557,335 B2 | 5/2003 | Amaro et al. |
| 6,579,053 B1 * | 6/2003 | Grams et al. ............... 414/269 |
| 6,682,032 B1 | 1/2004 | Bradlee |
| D489,963 S | 5/2004 | Mazooji et al. |
| 6,866,471 B2 * | 3/2005 | Grams et al. ............... 414/807 |
| 7,487,719 B2 * | 2/2009 | Fernandez et al. ............ 99/638 |

* cited by examiner

GRAPE HARVESTING SYSTEM

This is a divisional of application Ser. No. 11/437,679, filed May 22, 2006, now abandoned which is a divisional of application Ser. No. 11/001,013, filed Dec. 2, 2004, now U.S. Pat. No. 7,080,498, issued Jul. 25, 2006 all of which are incorporated herein by reference.

BACKGROUND OF THE INVENTION

1. Field of the Invention

The present invention relates to a system and method for harvesting fruit, and more particularly to a system and method for harvesting clusters of grapes.

2. Description of the Related Art

In conventional systems and methods for harvesting, handling, and packing grape clusters, a picker approaches a grape vine, grabs a grape cluster (or bunch) either by its stem or by the grape berries themselves, cuts the stem to separate the cluster from the vine, and places the cluster in a container for subsequent transfer to a sorting or packing station. Where a conventional grape-harvesting vehicle is being used, the grape cluster is mechanically separated from the vine, placed on a conveyor belt, conveyed to a vehicle, and then hauled to a processing station. At the packing station, which typically is located at a remote location, a packer picks up the grape clusters, sorts them by grape berry quality and type (a typical sort may include separating the grape clusters into wine/juice grade grapes, jelly/jam/marmalade grade grapes, and table grade grapes), partially wraps each sorted grape cluster in paper, plastic, or other material and lays the grape cluster into a box, one cluster next to another until the box is filled and is prepared to be closed up. Full boxes are stacked on a pallet, and the full pallet is wrapped, banded, and shipped.

During the above-described conventional procedure, the grape berries in the clusters are handled frequently, and/or laid on a conveyor in contact with a conveyor belt. This frequent contact with the grape berries results in bruises and minor damage to some of the grape berries. For wine/juice grade grapes, or jelly/jam/marmalade grade grapes, such occasional minor berry damage is relatively inconsequential since the berries will be subsequently rendered. For table grade grapes, however, this damage creates a problem. Consumers of table grapes tend to be reluctant to buy or consume bruised or damaged grapes, and a cluster with numerous bruised or damaged grapes may be unsellable and go to waste, representing a financial loss to the grape grower and to the seller.

Past attempts to harvest table grapes, while avoiding damage to the grape berries, however, have proven to be slow, inefficient, and not cost-effective.

It is desirable to have a system and method for harvesting grapes, particularly table grade grapes, which can harvest the grapes quickly and efficiently, without touching the grape berries, or with only minimal physical contact with the grape berries, in order to minimize or prevent damage thereto.

SUMMARY OF THE INVENTION

The advantages and purpose of the invention will be set forth in part in the description which follows; and in part will be apparent from the description, or may be learned by practice of the invention. The advantages and purpose of the invention will be realized and achieved by means of the apparatus and method set forth in the attached claims.

To attain the advantages and in accordance with the purpose of the invention, as broadly described herein, the invention is a system and method for harvesting grape clusters.

A grape cluster hanger clip is provided for handling a grape cluster by the stem during the steps of cutting the stem, conveying the cluster to a packing station, and packing the cluster. The grape cluster hanger clip includes an elongated member with two distal ends, a generally annular portion being provided atone distal end, and a generally U-shaped portion, defining a substantially 180° turn, provided midway between the two distal ends, dividing the elongated member into first and second elongated member portions. A gap is defined between the first elongated member portion and the second distal end at the tip of the second elongated member portion. The gap merges into an area between the first and second elongated member portions. The dimensions of the area are smaller than the dimensions of the gap. In use, a stem of a grape cluster squeezes through the gap, and is held in the area between the first and second elongated member portions, by pressure applied by the second elongated member portions and due to a spring force in the generally U-shaped member.

The stem can be cut, the cluster held by the picker suspended from the hanger clip, and the hanger clip can be hung suspended from a chain conveyor, to be conveyed to a packing station on a grape harvesting vehicle, which is described below. During the cutting, transfer, and packing operations, the picker and the packer may hold the cluster by the hanger clip, and need not touch the grape berries themselves.

In accordance with the invention, the grape harvesting vehicle includes a generally horizontal platform, which can be raised to a first height $h_1$ above the height of grape vines in a vineyard during grape harvesting operations, and lowered to a second height $h_2$ suitable for highway travel, garage storage, and maintenance. The first height $h_1$ is higher than the second height $h_2$. The platform supports a plurality of conveyors, each conveyor conveying suspended grape clusters to a respective packing station, each packing station being located on the platform.

At each packing station, a packer removes the grape clusters from the respective conveyor, sorts them by grape quality, and packs the sorted grape clusters in boxes (with the grape cluster hanger clip either removed from or left on the stem). The packer then slides full boxes onto a box conveyor for transfer to a palletizing station, located proximate the center of the platform.

At the palletizing station, the full boxes are removed from the box conveyor and hand stacked onto a pallet positioned on a pallet tray. In the pallet tray, the sides of the stacked boxes on the pallet are aligned with one another by the sides of the tray. When full, the pallet tray is shifted to the center of the palletizing station, a pallet jack lifts the pallet from the tray and the tray is returned to its original position. The pallet is then wrapped with a cover sheet and banded, picked up by the trolley, conveyed to an opening provided in the platform, lowered down, and deposited on the ground for subsequent recovery and shipping.

In an alternative embodiment, the grape cluster hanger clip is fixed to the chain conveyor via a pivotal connection. The cluster is cut and then attached to the hanger clip to be conveyed to the packing station. The pivotally-connected hanger clip can pivot and maintain vertical orientation of the grape cluster, even when the conveyor rotates around the circumference of a cylindrical pulley.

The grape cluster hanger clip also can be modified by installing a hinged connection in the generally U-shaped portion, between the first elongated member portion and the second elongated member portion, including a spring to apply pressure on the second elongated member portion to hold the stem in place.

It is to be understood that both the general description above and the detailed description below are exemplary only and are not restrictive of the scope of the invention.

BRIEF DESCRIPTION OF THE DRAWINGS

The accompanying drawings, which are incorporated in and constitute a part of the specification, illustrate presently preferred embodiments of the invention, and together with the description, serve to explain the principles of the invention. In the drawings.

DESCRIPTION OF THE PREFERRED EMBODIMENTS

Reference will now be made in detail to the presently preferred embodiments of the invention, examples of which are illustrated in FIGS. 1-12. Whenever possible, the same reference numbers will be used throughout the drawings to refer to the same or like parts.

Figure 1:
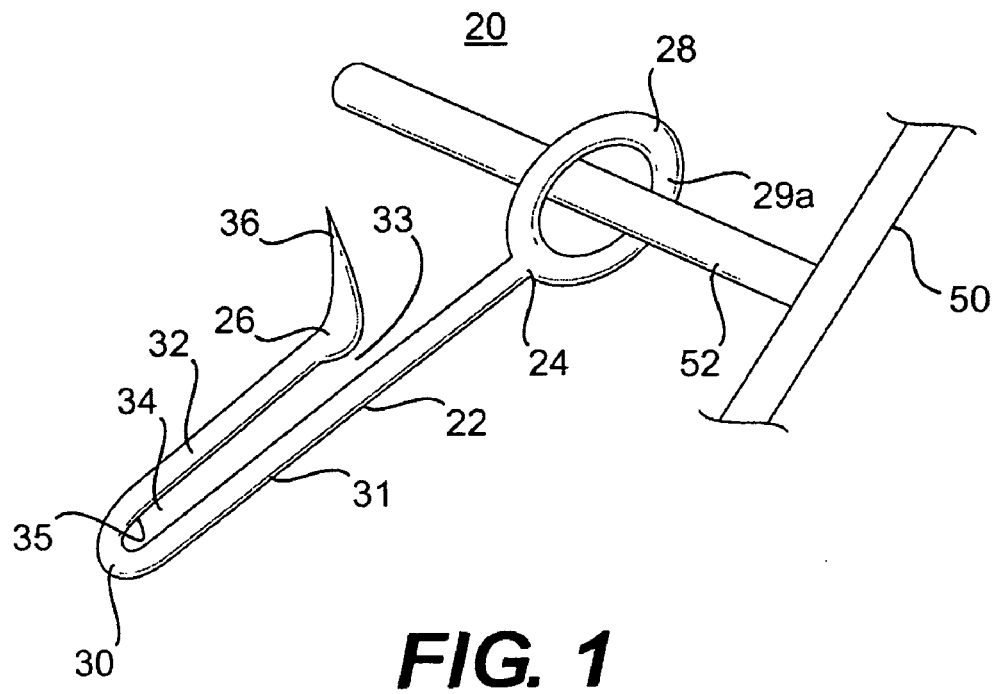
FIG. 1 is a perspective view of a first preferred embodiment of a grape cluster hanger clip in accordance with the invention.
Figure 2:
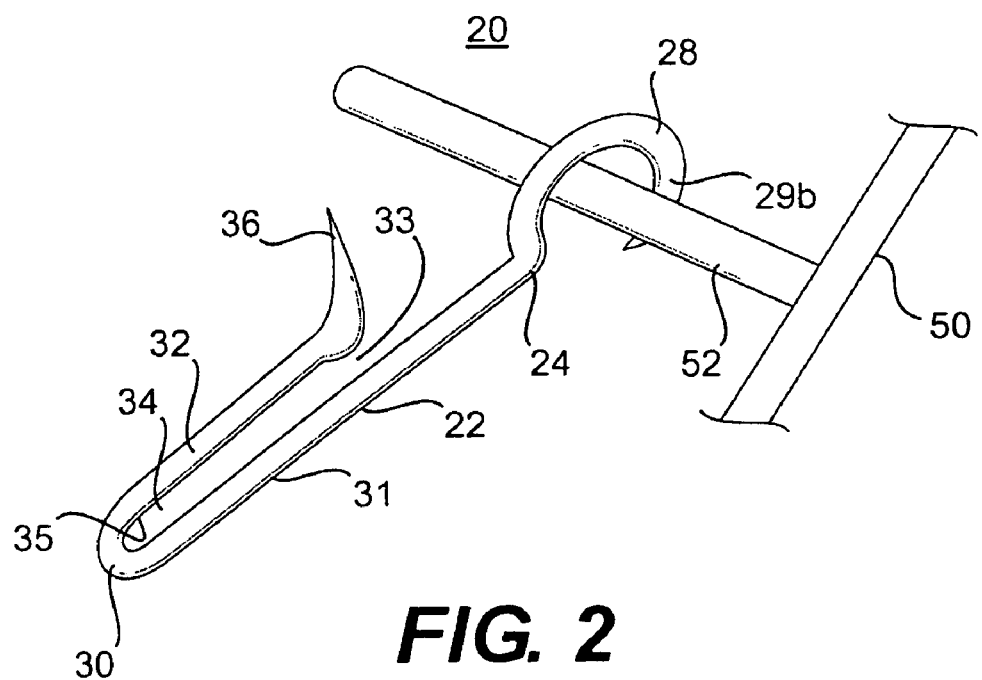
FIG. 2 is a perspective view of another preferred embodiment of the grape cluster hanger clip of the invention.
Figure 3:
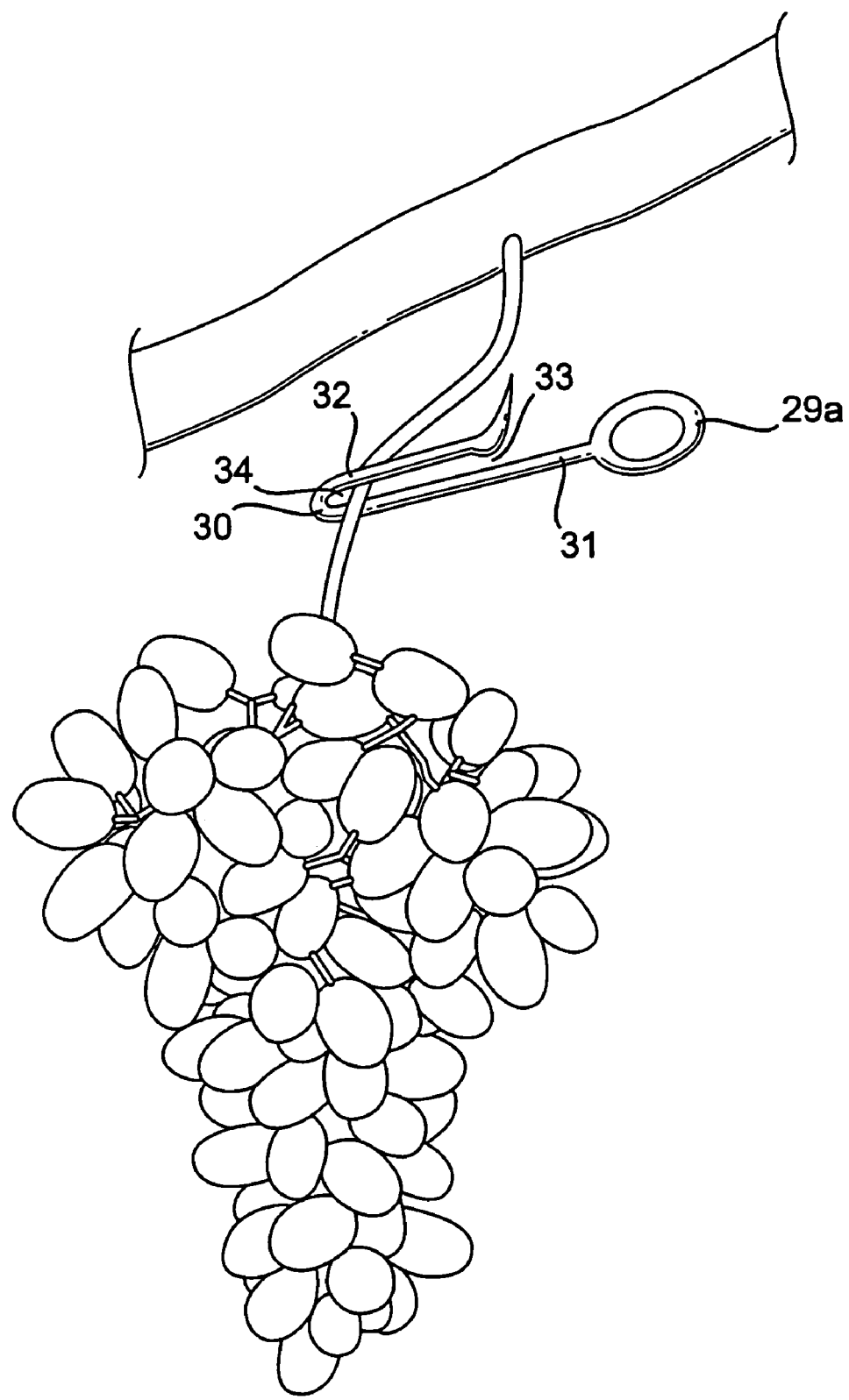
FIG. 3 is a perspective view of the grape cluster hanger clip of FIG. 1, gripping a stem of a grape cluster.

In accordance with the invention, and as broadly embodied, for example, in FIGS. 1 and 2, a grape cluster hanger clip 20 is provided. The grape cluster hanger clip 20 includes an elongated member 22, having first and second distal ends 24 and 26. As embodied in FIG. 1, an annular portion 28 is provided at first distal end 24. Elongated member 22 has a substantially 180° bend at a position intermediate the distal ends 24 and 26, featuring a U-shaped portion 30. The U-shaped portion 30 defines a first elongated member portion 31 and a second elongated member portion 32. The second elongated member 32, and the second distal end 26 curve up and back toward the first distal end 24 and the first elongated member 31. A narrow gap 33 is defined between distal end 26 and first elongated member 31. The gap 33 merges into an area 34 in the direction of U-shaped portion 30 between the first elongated member portion 31 and the second elongated member portion 32. The distance in area 34 between elongated member portions 31 and 32 is smaller than the distance in gap 33 between elongated member portions 31 and 32. The distance of gap 33 is selected such that a stem of a grape cluster can pass therebetween, with the stem thereafter being caught and held in the area 34. A flange 36 is provided at the second distal end 26. Referring to FIG. 3, the stem passes through gap 33 and is held in place in area 34. U-shaped portion 30 has a spring force, so that second elongated member 32 can flex away from the first elongated member 31, as needed to allow the stem to pass through the gap 33, and then spring back into position to hold the stem in place in the space 34. An elastic material layer 35 also can be applied to the surfaces within gap 33 and area 34, to compress the stem therebetween without damaging the stem.

FIG. 2 depicts a variation of the embodiment of the grape cluster hanger clip of FIG. 1. The difference is that annular portion 28 in the embodiment of FIG. 1 defines a ring 29a, whereas annular portion 28 in the embodiment of FIG. 2 defines a hook 29b, in place of ring 29a.

Figure 10:
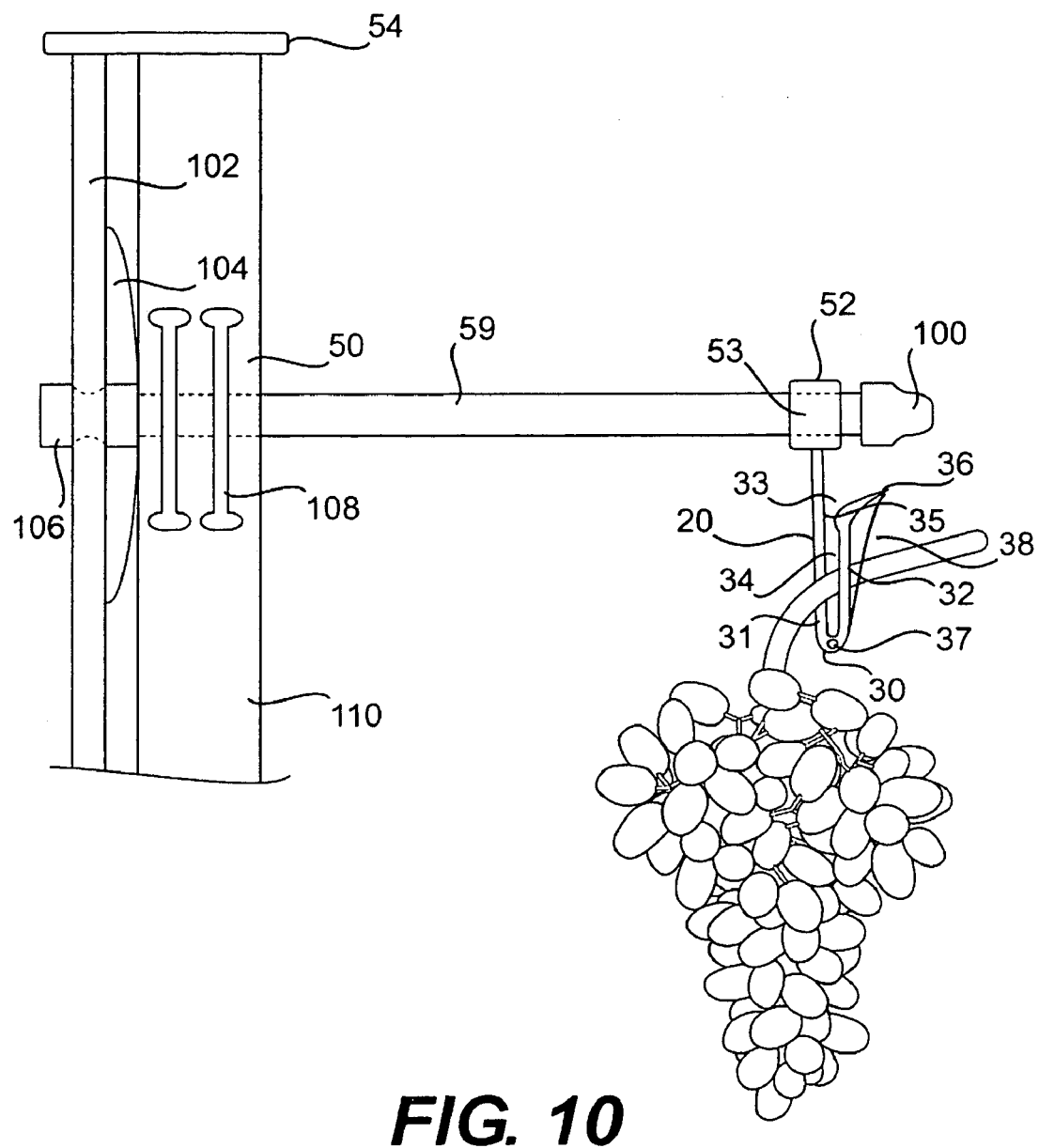
FIG. 10 is a side view of an embodiment of a grape conveyor used with the grape harvesting vehicle of FIGS. 4 and 5, with another preferred embodiment of a grape cluster hanger clip, permanently fixed to the conveyor.

In an alternative embodiment, as shown in FIG. 10, grape cluster hanger clip 20 is pivotally fixed to a conveyor cable, as described below. In this embodiment, a hinge 37 is provided in the U-shaped portion 30, so that second elongated member 32 pivots hingedly away from and back towards first elongated member 31. When second elongated portion 32 is pivoted back toward first elongated portion 31, a grape cluster stem can be held in place in area 34. In order to apply tension to the second elongated member portion 32 in the closed position, a spring 38, preferably a leaf spring, is provided between hinge 37 and flange 36 at the second distal end 26.

The present invention further encompasses a grape harvesting system 40, including a grape cluster hanger clip 20, as broadly described above, and a mobile grape harvesting vehicle 42. The grape harvesting vehicle 42 is broadly described below.

Figure 4:
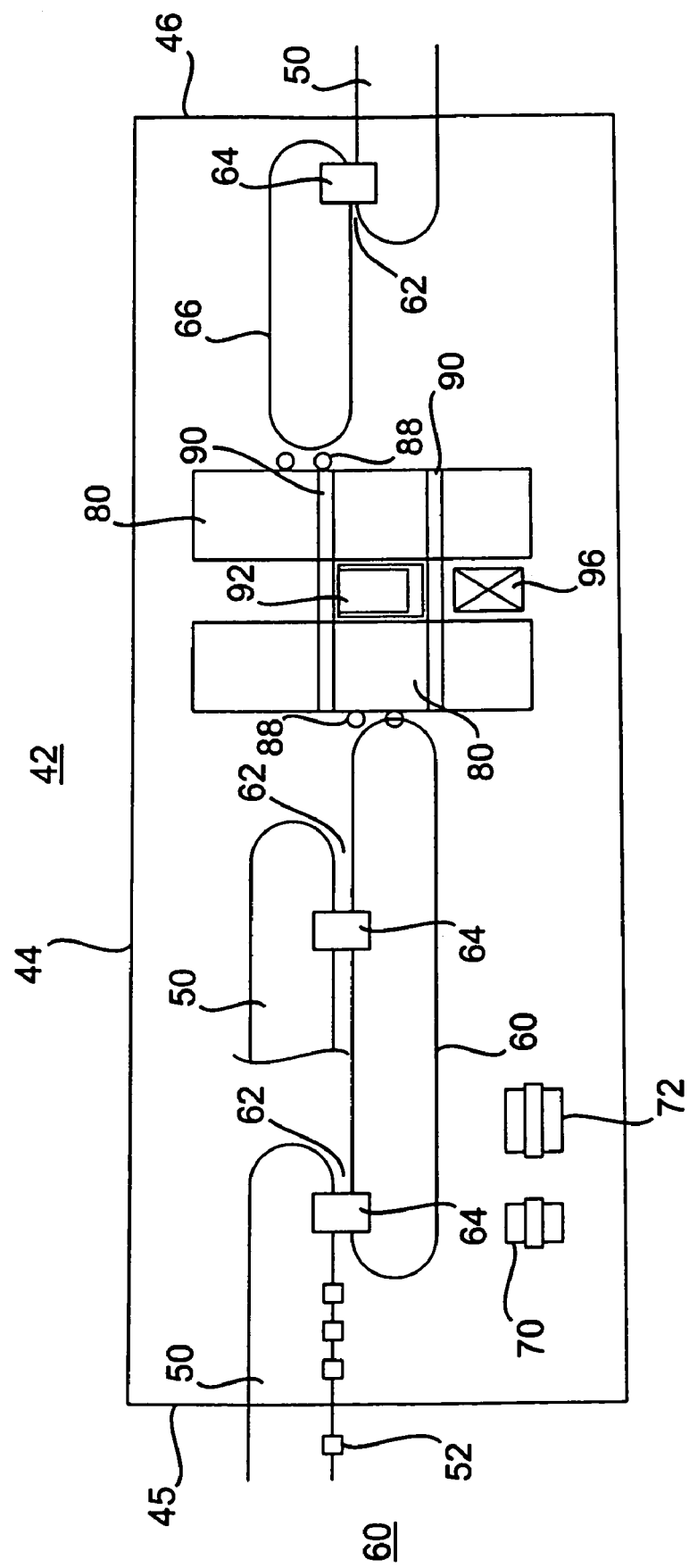
FIG. 4 is a top view of a preferred embodiment of a grape harvesting vehicle in accordance with the invention.
Figure 5:
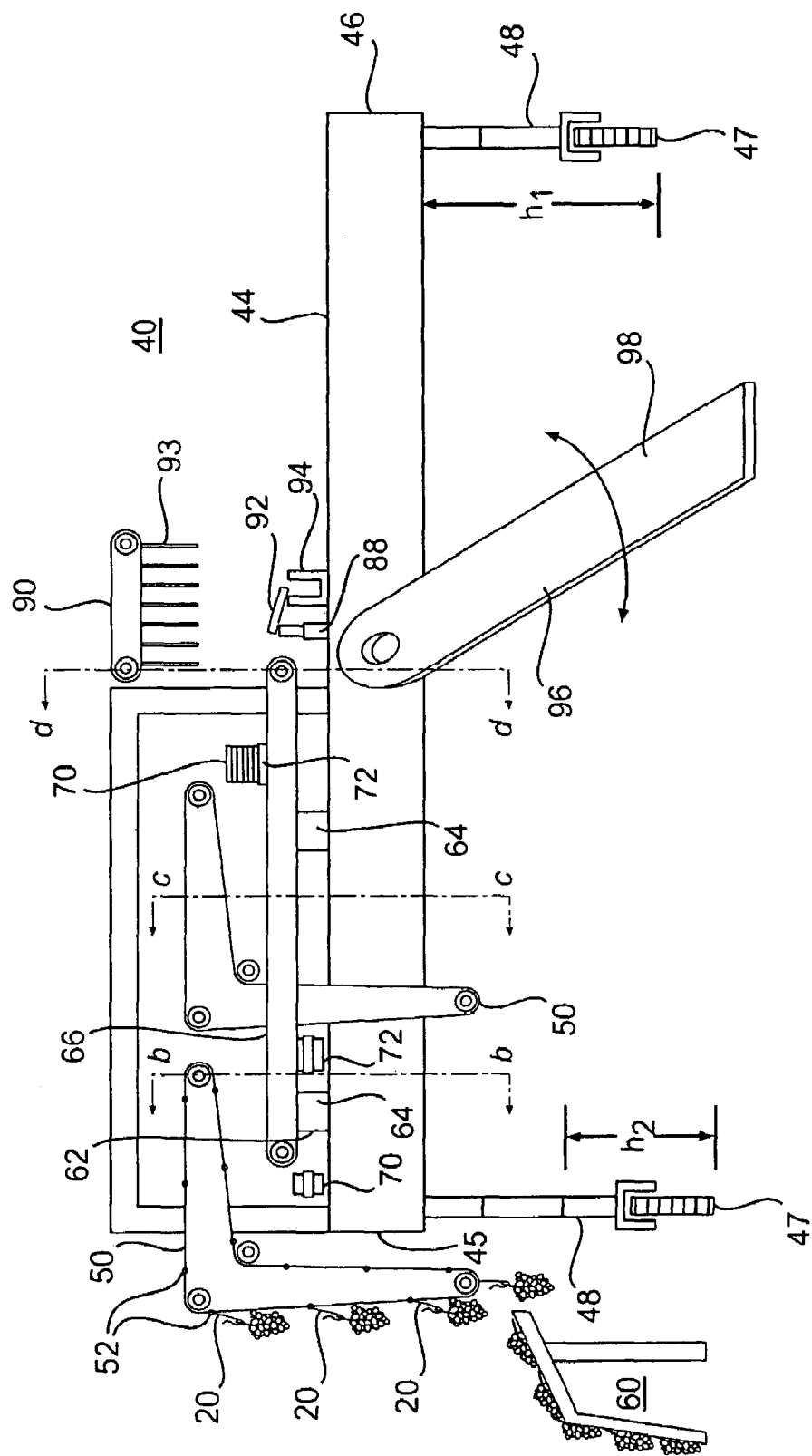
FIG. 5 is a front view of the grape harvesting vehicle of FIG. 4 with the platform at height $h_1$.

Referring to FIGS. 4 and 5, mobile grape harvesting vehicle 42 includes a generally rectangular and generally horizontal, steerable platform 44, having right and left sides 45, and 46, mounted on a set of wheels 47. The wheels 47 are linked to platform 44 via a set of legs 48, with plural sets of the legs 48 provided on each side 45 and 46 of the platform 44. The wheels 47 preferably are fitted with tires, suitable for travel both off-road and on-road, permitting vehicle 42 to travel along rows of grape vines at a vineyard, and on paved roads to and from the vineyard.

Figure 6:
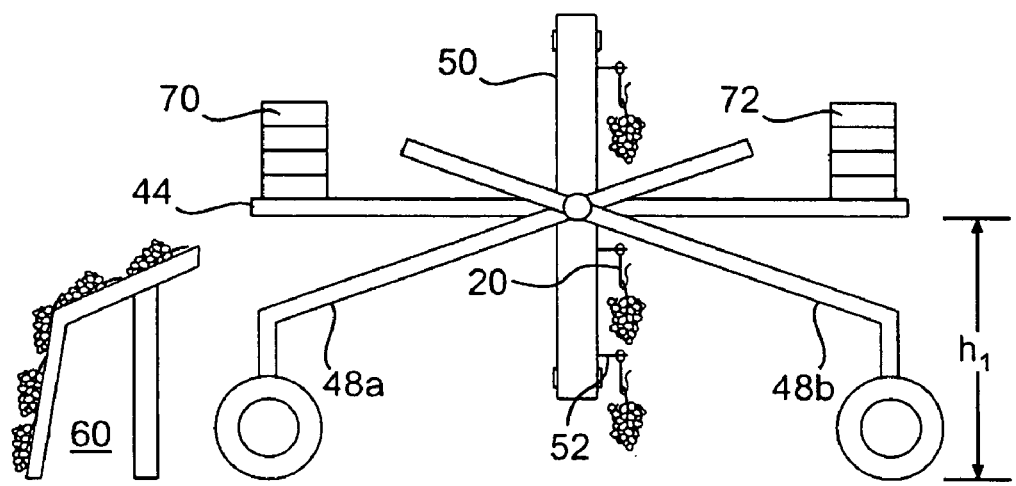
FIG. 6 is a cross-sectional view of the grape harvesting vehicle of FIG. 5, taken along line b-b.

Each pair of legs 48 on the side of platform 44 preferably defines a pair of pivotally connected cross-links 48a, 48b, configured to extend downward, with hydraulic or pneumatic power and control, thereby extending to raise platform 44 to a first height $h_1$, shown, e.g., in FIGS. 5 and 6, which is higher than height of selected grapevines at the vineyard to be harvested. Vehicle 44 usually is set at height $h_1$ for grape harvesting. Each pair of leg cross-links 48a, 48b, also pivots to lower the platform 44 to a second, lower height $h_2$, shown, e.g., in FIG. 9, used when vehicle 42 is in transit, storage, or maintenance. Height $h_2$ is selected so that vehicle 42 can meet local ordinances for vehicle height on public roadways, can pass beneath bridges, and fit into a storage shed or garage.

Figure 12:
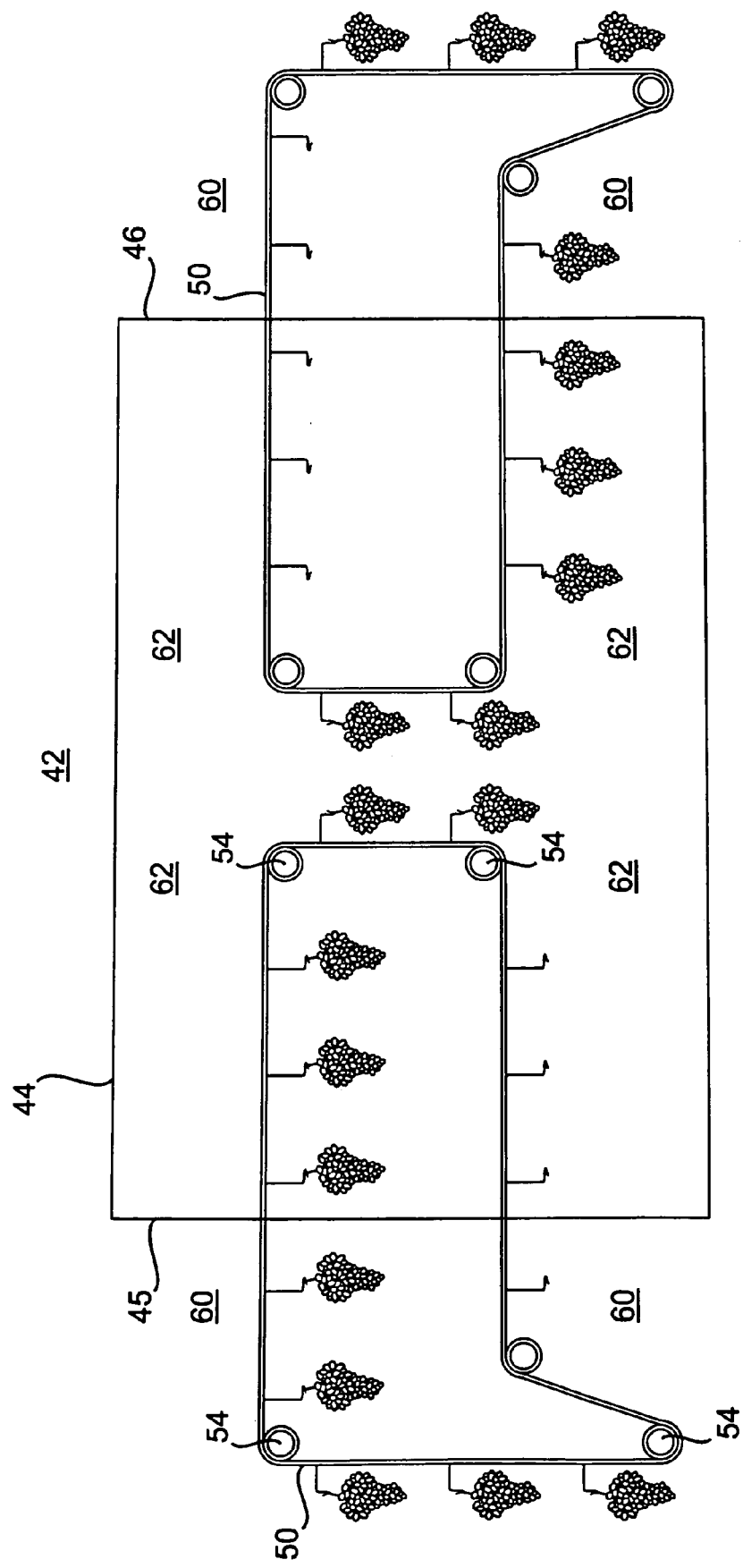
FIG. 12 is a pivotal top view of the grape harvesting vehicle as shown in FIG. 4, but with a single continuous grape cluster conveyor in place of two grape cluster conveyors.

Platform 44 includes a plurality of conveyors 50 mounted on the right and left sides 45, 46, preferably with at least two conveyors 50 per side. It is further possible, as shown in FIG. 12, that the grape cluster conveyor 50 can be one single continuous conveyor 50 provided on each side 45 and 46 of platform 44, servicing each picking station 60 and each packing station 62 on the respective side. Conveyors 50 preferably include a series of brackets 52, each bracket 52 being configured to receive and mount a grape cluster hanger clip 20. In one embodiment, as shown in FIG. 1, the bracket 52 is a horizontal bar, and the annular ring 29a of the hanger clip 20 attaches thereto by being slid onto the bar. In the embodiment of FIG. 2, wherein the annular portion 28 defines a hook 29b, the hook 29b hooks onto the straight bar of bracket 52. In either case, when the grape cluster hanger clip is attached to conveyor 50, the grape cluster preferably is suspended with the grape berries hanging freely and vertically, and not laying on or resting against the conveyor 50.

Referring to FIG. 10, another preferred embodiment of grape cluster hanger clip 20 is fixed to conveyor 50. In this embodiment, a stem 59 is pivotally connected to a bracket 52 via a pivotal attachment 53. The hinged grape cluster hanger clip 20 holds the grape clusters suspended to hang vertically. The pivotal attachment 53 ensures that the grape cluster continues to hang vertically, even when the conveyor 50 passes around the circumference of a cylindrical pulley 54.

Each conveyor 50 transfers cut grape clusters from a picking station 60, located on the ground proximate the grape vines, and proximate the respective side of the platform 44, to a packing station 62, located on the platform 44. Each conveyor 50 conveys grape clusters from a respective picking station 60 to a respective packing station 62, so, preferably, the vehicle 42 will have, operating simultaneously, at least four (4) picking stations 60, and four (4) packing stations 62.

At each picking station 60, a picker grabs a grape cluster by its stem, and cuts the stem. When using the portable grape cluster hanger clip 20 embodiment of FIG. 1 or 2, the picker grabs the stem with the cluster hanger clip 20 before cutting it, but with the fixed cluster hanger clip embodiment of FIG. 10, the picker grabs the stem with the cluster hanger clip 20 after cutting it. In either hanger clip embodiment, the cut stem is held in space 34 of the respective grape cluster hanger clip 20, and the hanger clip 20 is suspended from a bracket on the nearest respective conveyor 50.

Each packing station 62 includes a table 64, and a continuous horizontal roller or belt conveyor 66, supported on the platform 44. The belt conveyor 66 travels from the packing station 62 to the center of the platform 44. A packer works at each table 64, with a plurality of empty boxes 70. The packer removes each grape cluster from its respective bracket 52 of the respective conveyor 50, segregates the cluster by quality of the grape berries, partially wraps the cluster, and places the cluster, based on the quality of its berries, into a selected box 70. The boxes 70 typically are Styrofoam boxes, with standard dimensions of 13½"×20" or else 16"×20". The packer preferably lays each wrapped cluster in its respective box 70, either first removing the grape cluster hanger clip 20, or else leaving it in place attached to the stem of the cluster. As boxes become full, the packer shifts the full boxes 70 from the packing table 64, onto a belt conveyor 66 and the full boxes 70 are conveyed to palletizing station 80, proximate the center of platform 44.

At the palletizing station 80, a palletizer places a pallet 72 into a L- or U-shaped tray 92. The pallets 72 are typically hardwood pallets, with standard dimensions of 40"×48". The palletizer removes full boxes 70 from the belt conveyor 66, and stacks the full boxes 70 onto the pallet. Each tray 92 has at least two vertical angle iron sides 94 whereby the vertical sides of full boxes 70, stacked on the respective pallet 72, are aligned vertically. The palletizer segregates by grade, and stacks full boxes 70 on any one of four (4) palleted trays 92. Preferably fifty-six (56) full boxes 70 are placed on each pallet 72, stacked eight (8) boxes high. When each pallet 72 is filled with full boxes 70, the palletizer hydraulically shifts the tray 92 to the proximate center of the platform 44, beneath an overhead winched—roller trolley 90. In turn, the pallet 72 is lifted from the tray 92 by a hydraulic pallet jack 88 allowing the tray 92 to be returned to its original location. The pallet 72, stacked with full boxes 70, is ready to be covered with a tarpaulin, preferably made of clear plastic, and wrapped with a band. Then lifting straps 93 suspended from the overhead winched roller-trolley 90 are attached to the loaded pallet 72, the pallet jack 88 is lowered, and the winched roller-trolley shifts the loaded pallet 72 to double doors 96 provided near the center of platform 44. The double doors 96 open downward, assisting as guides 98 for the pallet 72 to be lowered through the opening in platform 44 to the ground. As the harvesting machine continues rolling forward down the respective rows of grape vines to the next packing station 60, the loaded, covered, and banded pallets 72, left on the ground in the vineyard, will be picked up later for shipping and/or storage.

Figure 11:
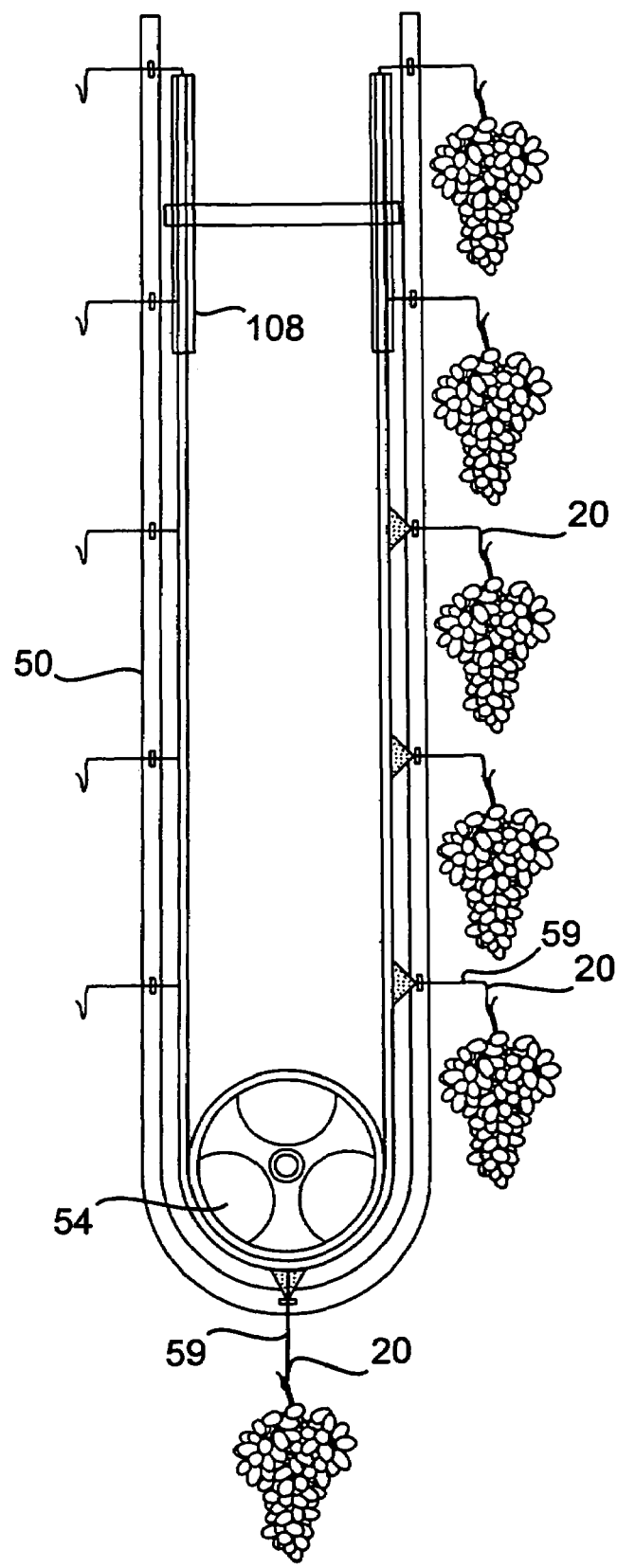
FIG. 11 is a side view depicting operation of the conveyor and fixed hanger clip of FIG. 10.

Referring to the embodiment of FIGS. 10 and 11, grape cluster hanger clip 20 is fixed to a bracket 52 of the conveyor 50 via an elongated rod 59. Rod 59 is pivotally connected to the annular portion 28 of grape cluster hanger clip 20 via a lock nut 100. The opposite end of elongated rod 59 attaches to a cable 102, preferably a ⅜" cable, of conveyor 50 with a cable gusset 104 and a clamp 106. A pair of carrier rollers 108 are mounted on rod 59 to roll on a 1½" guide track 110. The pivotal connection between elongated rod 59 and fixed grape cluster hanger clip 20 is provided so that when conveyor 50 transits around a pulley 54, the grape cluster hanger clip 20 will rotate, as shown in FIG. 11, in order to maintain the vertical hanging orientation of the grape cluster.

Figure 7:
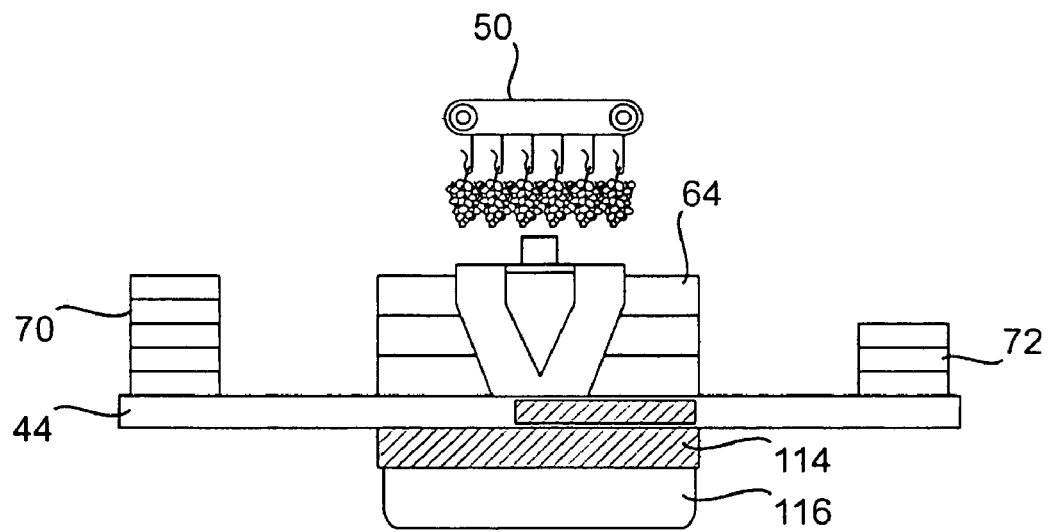
FIG. 7 is another cross-section view of the grape harvesting vehicle of FIG. 5, taken along line c-c.
Figure 8:
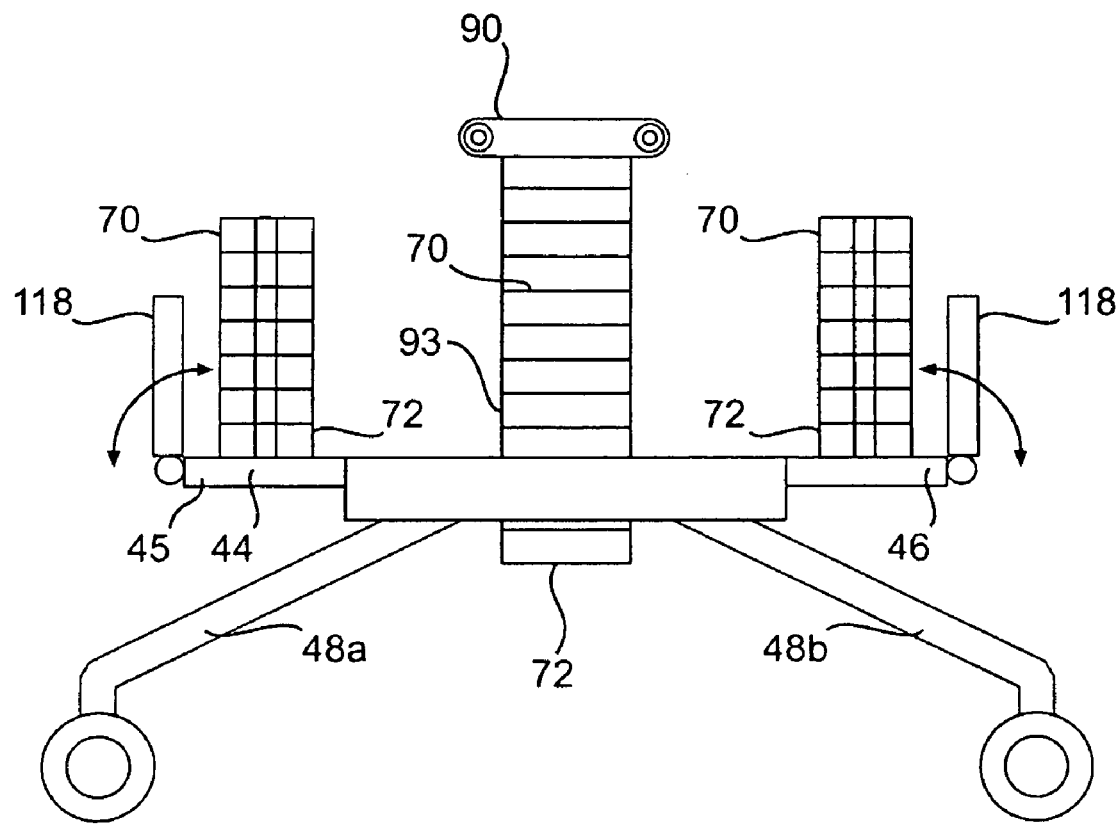
FIG. 8 is another cross-sectional view of the grape harvesting vehicle of FIG. 5, taken along line d-d.
Figure 9:
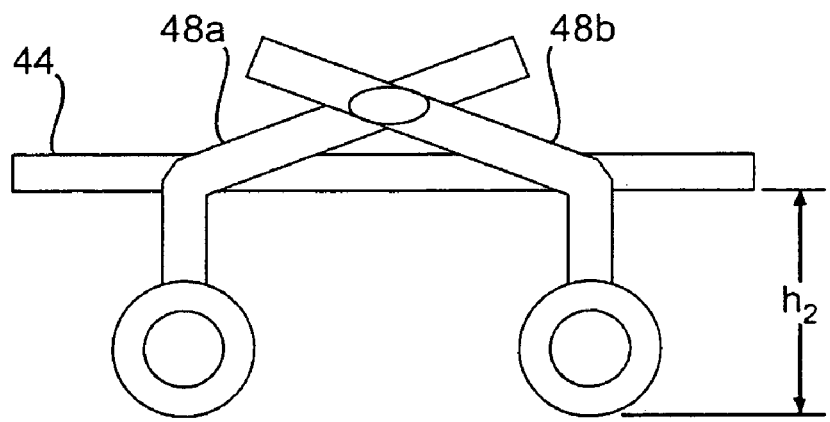
FIG. 9 is another cross-sectional view of the grape harvesting vehicle of FIG. 5, with the platform at height $h_2$.

As further embodied in FIG. 7, an optional juicing apparatus 114, and a juice storage tank 116 can be provided on the platform 44. Furthermore, as shown in FIG. 8, one or more wings 118 are pivotably attached to the sides 45 and 46 of platform 44. Pivotal wings 118 are pivoted upward to a vertical position for highway travel and vehicle storage, or alternately one or both of the wings 118 can be pivoted downward to a horizontal position, as needed, to provide additional storage space for boxes, pallets, spare parts and the like.

In accordance with the present invention, as broadly described herein, because the grape stem is gripped with the grape cluster hanger, and the cluster hanger is hung suspended from a bracket on the grape conveyor, the berries in each grape cluster need not be touched by the picker, are not touched by the conveyor, and are touched only minimally by the packers, substantially reducing the amount of contact with the berries, and thereby substantially reducing the risk of damage to the grape berries. Locating the packing station on the vehicle platform proximate the picking station reduces the amount of time required to harvest and package the grapes. Stacking and binning of the grape boxes in the pallets results in neatly stacked, uniformly-configured pallets, which can be stored and/or shipped quickly and efficiently. Hence, the present invention provides an apparatus and method for harvesting and packaging high-quality table grapes, quickly and efficiently, with no or only minimal damage to the grapes.

It will be apparent to those skilled in the art that modifications and variations can be made in the structure and operation of the apparatus described above, without departing from the spirit or scope of the invention. It is intended, therefore that the present invention cover all such modifications and variations, provided that they come within the scope of the appended claims and their legal equivalents.

What is claimed is:

1. A grape harvesting system comprising:
  a grape cluster hanger clip comprising:
    an elongated member having first and second distal ends;

a generally U-shaped portion provided midway between said first and second distal ends, dividing said elongated member into first and second elongated portions, said first elongated portion extending in a first direction between said annular portion and said U-shaped portion, said U-shaped portion defining substantially a 180° turn, said second elongated portion extending in a second direction substantially parallel to said first direction, between said U-shaped portion and said second distal end;

a gap being defined between said second distal end and said annular portion, merging into an area provided between said first and second elongated portions, said gap comprising a first distance between said second distal end and said annular portion, and said area comprising a second distance and between said first and second elongated portions, said second distance being selected to hold a stem of the grape cluster between the first and second elongated portions;

a first conveyor attached to a platform comprising a means for supporting the grape cluster by supporting said annular portion of said device, thereby hanging the grape cluster by the stem, and conveying the grape cluster to one of a plurality of packing stations on said platform;

a second conveyor for conveying a plurality of boxes, each said box being packed with grape clusters from the packing station, to a palletizing station;

a pallet for receiving the boxes;

a tray for aligning the boxes on the pallet; and means for lowering the pallet from said platform.

2. The grape harvesting system of claim 1, wherein said platform is mobile.

3. The grape harvesting system of claim 1, wherein said platform is steerable.

4. The grape harvesting system of claim 1, wherein said platform further comprises juicing means for rendering grapes into juice, and a juice storage tank.

5. The grape harvesting system of claim 1, wherein said platform is adjustable in height.

6. The grape harvesting system of claim 1, wherein said platform is configured to move adjacent a row of grape vines with said platform above the row of grape vines.

7. The grape harvesting system of claim 1, further comprising a pallet jack for lifting the loaded pallet.

8. The grape harvesting system of claim 1, wherein said first distal end of said elongated member of said hanger clip is fixed to said grape cluster conveyor.

9. The grape harvesting system of claim 1, wherein said hanger clip is attachable and detachable from said grape cluster conveyor.

10. The grape harvesting system of claim 1, wherein said first distal end of said elongated member comprises a generally annular portion attachable to said grape cluster conveyor.

11. The grape harvesting system of claim 1, wherein said hanger clip is attached to the stem of the grape cluster after the stem is cut.

12. The grape harvesting system of claim 1, wherein said hanger clip is attached to the stem of the grape cluster before the stem is cut.

13. The grape harvesting system of claim 1, wherein said tray aligns sides of the plurality of boxes on the pallet.

14. The grape harvesting system of claim 8, wherein said first distal end of said elongated member of said hanger clip is permanently fixed to said grape cluster conveyor.

15. The grape harvesting system of claim 8, wherein said first distal end of said elongated member of said hanger clip is fixed to said grape cluster conveyor via an elongated stem, pivotally connected to a bracket.

* * * * *